Figure 1:
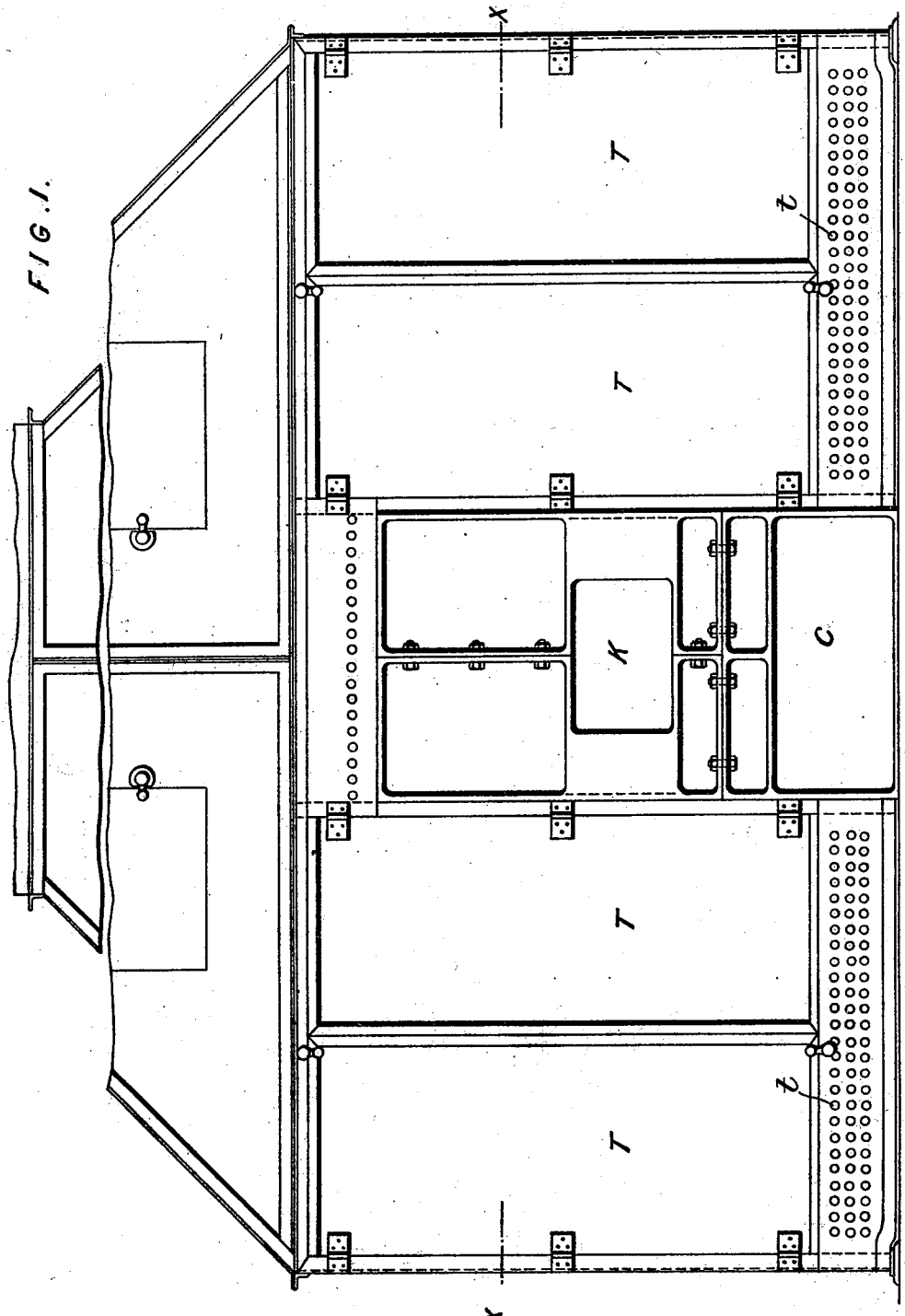

(No Model.) 6 Sheets—Sheet 2.
S. C. DAVIDSON.
STOVE AND APPARATUS FOR HEATING AIR.

No. 553,576. Patented Jan. 28, 1896.

WITNESSES:
Fred White
Thomas F. Wallace

INVENTOR:
Samuel Cleland Davidson
By his Attorneys:
Arthur C. Fraser & Co.

(No Model.) 6 Sheets—Sheet 4.

S. C. DAVIDSON.
STOVE AND APPARATUS FOR HEATING AIR.

No. 553,576. Patented Jan. 28, 1896.

WITNESSES:
Fred White
Thomas F. Wallace

INVENTOR:
Samuel Cleland Davidson,
By his Attorneys (No Model.) 6 Sheets—Sheet 5.
S. C. DAVIDSON.
STOVE AND APPARATUS FOR HEATING AIR.
No. 553,576. Patented Jan. 28, 1896.
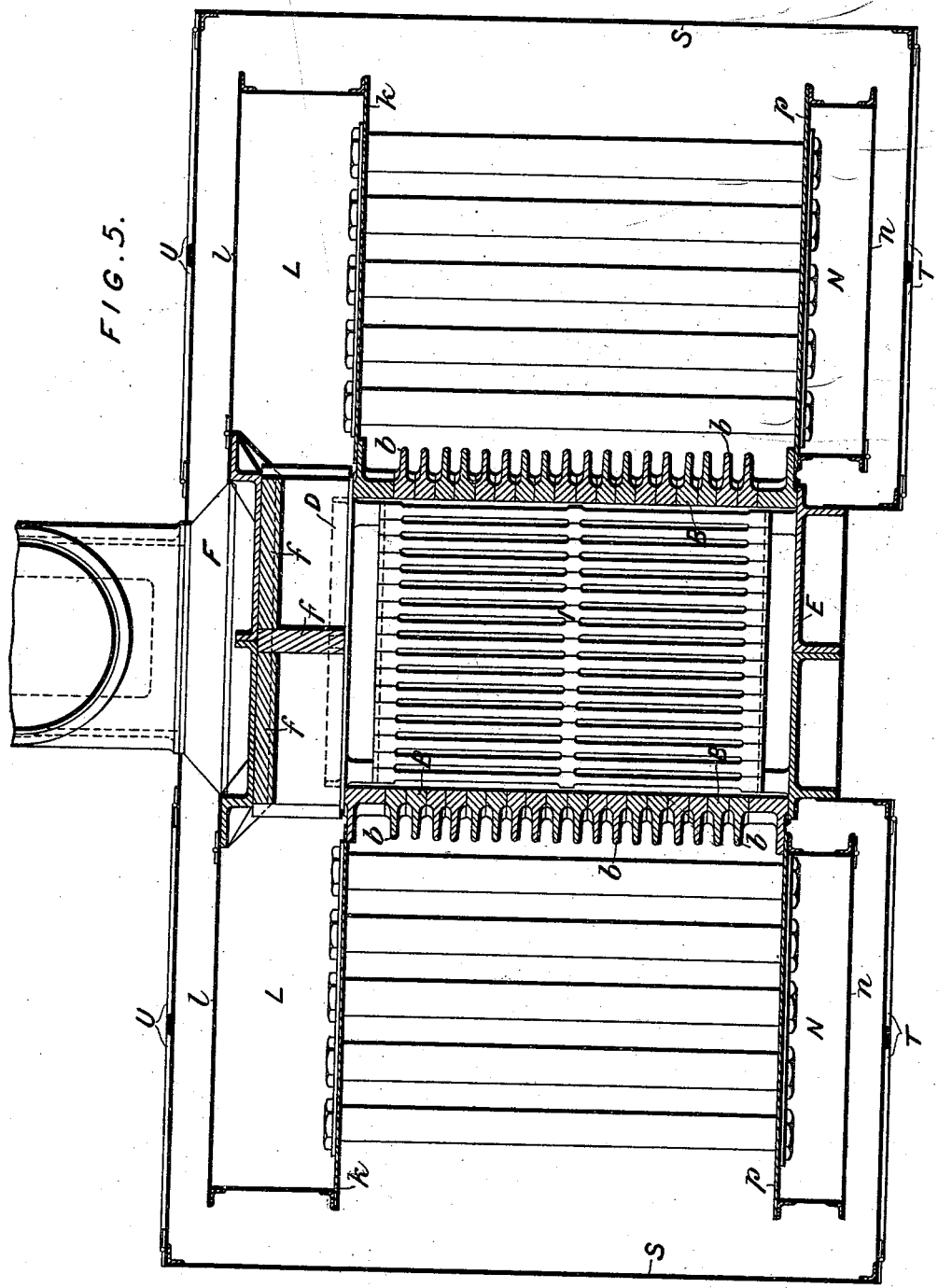
WITNESSES:
Fred White
Thomas F. Wallace
INVENTOR:
Samuel Cleland Davidson.
By his Attorneys (No Model.) 6 Sheets—Sheet
S. C. DAVIDSON.
STOVE AND APPARATUS FOR HEATING AIR.
No. 553,576. Patented Jan. 28, 1896.
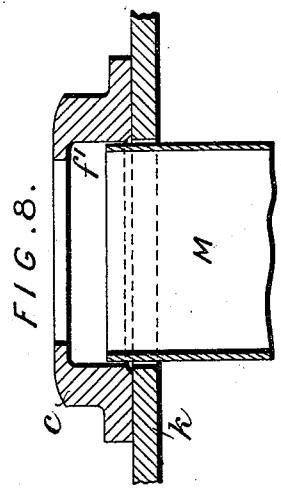
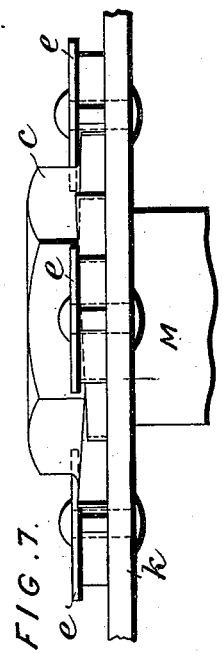
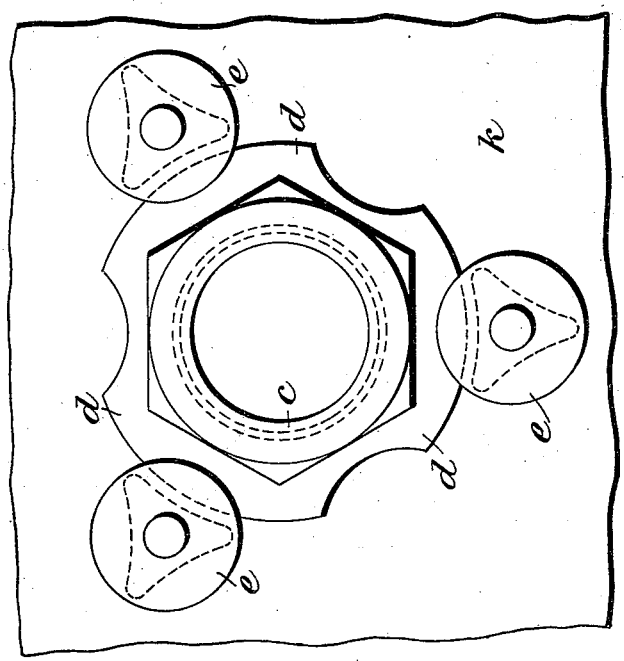
WITNESSES:
Fred White
Thomas F. Wallace
INVENTOR.
Samuel Cleland Davidson,
By his Attorneys
Arthur C. Fraser & Co.
ANDREW B. GRAHAM. PHOTO-LITHO WASHINGTON, D.C.

UNITED STATES PATENT OFFICE.

SAMUEL CLELAND DAVIDSON, OF BELFAST, IRELAND.

STOVE OR APPARATUS FOR HEATING AIR.

SPECIFICATION forming part of Letters Patent No. 553,576, dated January 28, 1896.

Application filed October 11, 1895. Serial No. 565,318. (No model.)

*To all whom it may concern:*

Be it known that I, SAMUEL CLELAND DAVIDSON, of Belfast, Ireland, have invented certain new and useful Improvements in Stoves or Apparatus for Heating Air, of which the following is a specification.

This invention has reference to stoves or apparatus for heating air, and its objects are to obtain a maximum volume of heated air in proportion to the amount of fuel consumed in the furnace of the stove, and at the same time to have those parts of the furnace or fireplace which are in the immediate proximity to the fire capable of withstanding its corrosive or smelting effects for a long period; also, to have other parts which are farther away from the fire shielded from direct radiant heat therefrom, and so constructed that in the event of the tubes or pipes therein employed also becoming burned or worn out they can easily be replaced by new ones without its being necessary to take down any considerable part of the stove for this purpose.

The invention chiefly consists in the combination, in a stove or apparatus for heating air, of a central furnace constructed as a gill stove, one or more smoke-chambers at the back of the said furnace and in communication therewith, a set of flow tubes or pipes parallel with the sides of the furnace, one or more front smoke-chambers, between which and the said back smoke-chambers the said tubes or pipes communicate, so as to conduct the products of combustion from the back chambers to the front chambers, a second or return set of tubes or pipes below and parallel with the flow set and leading from the front smoke-chambers, a back flue or chamber into which the said second set of tubes lead, the said back flue or chamber being in communication with the chimney, and an air-inlet or air-inlets at the lower part of the stove to admit air to be heated at such a part that it comes into contact with the lower or return set of tubes before passing over the upper and more highly-heated set.

The invention comprises an arrangement, as hereinafter described, for securing the tubes or pipes in the walls or sides of the smoke-chambers.

In carrying out the invention the improved stove or apparatus is constructed with the furnace or fireplace in the center of the stove, and with a number of narrow and relatively deep bars, of (preferably) cast-iron, bolted to one another so as to form continuously solid inclosing sides and top for the furnace from front to back, with gills cast on their outer edges similar to the ordinary so-called "gill" stove, and the interior sides of the furnace are also fitted with what I term "false sides," consisting of cast-iron plates or tiles, suitably constructed for admitting air from the ash-pit to above the surface of the fire, in order to complete the combustion of the gases arising therefrom. An opening is provided at the back of the fireplace for escape of the products of combustion into smoke-chambers which lead to right and left therefrom, and in each of these smoke-chambers, on the side or wall facing the front of the stove, there are perforations into which are inserted iron tubes or pipes which are arranged as a group on each side of and parallel to the furnace, at preferably above the level of the fire, to conduct the products of combustion to other and similar smoke-chambers on right and left of the front door of the furnace. These smoke-chambers extend downward to preferably the floor-level of the ash-pit, and the products of combustion on being delivered into the upper part of these front chambers descend and return again through a lower set or group of pipes to the lower part of the back smoke-chambers, separated from the upper part by a dividing-plate, and from which lower compartment they pass into the chimney, which is placed preferably at a slight distance from and immediately behind the back of the furnace.

The pipes which convey the products of combustion to and from the front and back smoke-chambers fit somewhat loosely into the above-mentioned perforations in the sides of the smoke-chambers, so that they are capable of sliding freely through same when being put into position, and their ends project slightly through the perforated plates of the smoke-chambers, and each end fits into a groove or glandular recess in an annular-shaped movable cap or encasing cover constructed with lugs formed as inclined planes, so that when the caps are turned round upon the projecting ends of the pipes they engage into catches or recesses in projecting snugs which are fitted on the corresponding face of the perforated side plates of the smoke-chambers, and which thus hold the caps firmly in position, and in order to make their joints smoke-tight the grooves or glands in the caps are lined with asbestos or any suitable cement in which the pipe ends are embedded. If any of these pipes require replacement from becoming in course of time corroded or burned through, it is only necessary to turn back the caps so as to free their lugs from the above-described catches or snugs at either end, whereupon the pipe can be easily withdrawn and a new one inserted and secured in its place.

The sides of the smoke-chambers facing the perforated sides containing the ends of the pipes are provided with suitable cleaning-doors for brushing out the pipes and removal of soot, and through which the pipes can be withdrawn when being changed. The whole stove is inclosed in a sheet-metal casing with the top preferably pyramid or cone shaped to converge the heated air as it rises from about the pipes and furnace into a tube or air-duct to convey it to wherever it may be required, and doors are provided in the sides of the casing opposite the cleaning-doors in the smoke-chambers to conveniently get at them.

Some of the advantages of my improved stove, in addition to the durable construction of the furnace and easy replacement (when such may be necessary) of any of the tubes or pipes, are that the body and ends of the pipes, owing to their relative situation in respect to the furnace, and to their not being in contact with its sides, are not exposed to the direct radiant heat from the fire itself and receive almost no heat from it by conduction, so that they are practically therefore only heated by the products of combustion passing through them. Consequently it is merely at their hottest ends (and then only under the exceptional circumstances due to forced firing) that they attain a red heat sufficient to corrode or burn them out, and as the hottest gases from the fire traverse the upper groups of the pipes first, and then afterward pass to the lower ones over which flows the first inrush of cold air to be heated, the hot gases from the fire are thus very efficiently cooled before passing to the chimney. Further, as the passages for the flow of the air to be heated by the stove are very open and free among the pipes and over the furnace-gills, so that the air in passing among them encounters a minimum of friction, and as the total area of effective heating-surfaces for the air passing through the stove is relatively very large in comparison to the size of the fire being burned therein, the volume of air heated and amount of heat transmitted thereto from the fire are both so great that they show very high results both for efficiency and economy as regards the amount of fuel consumed.

Figure 2:
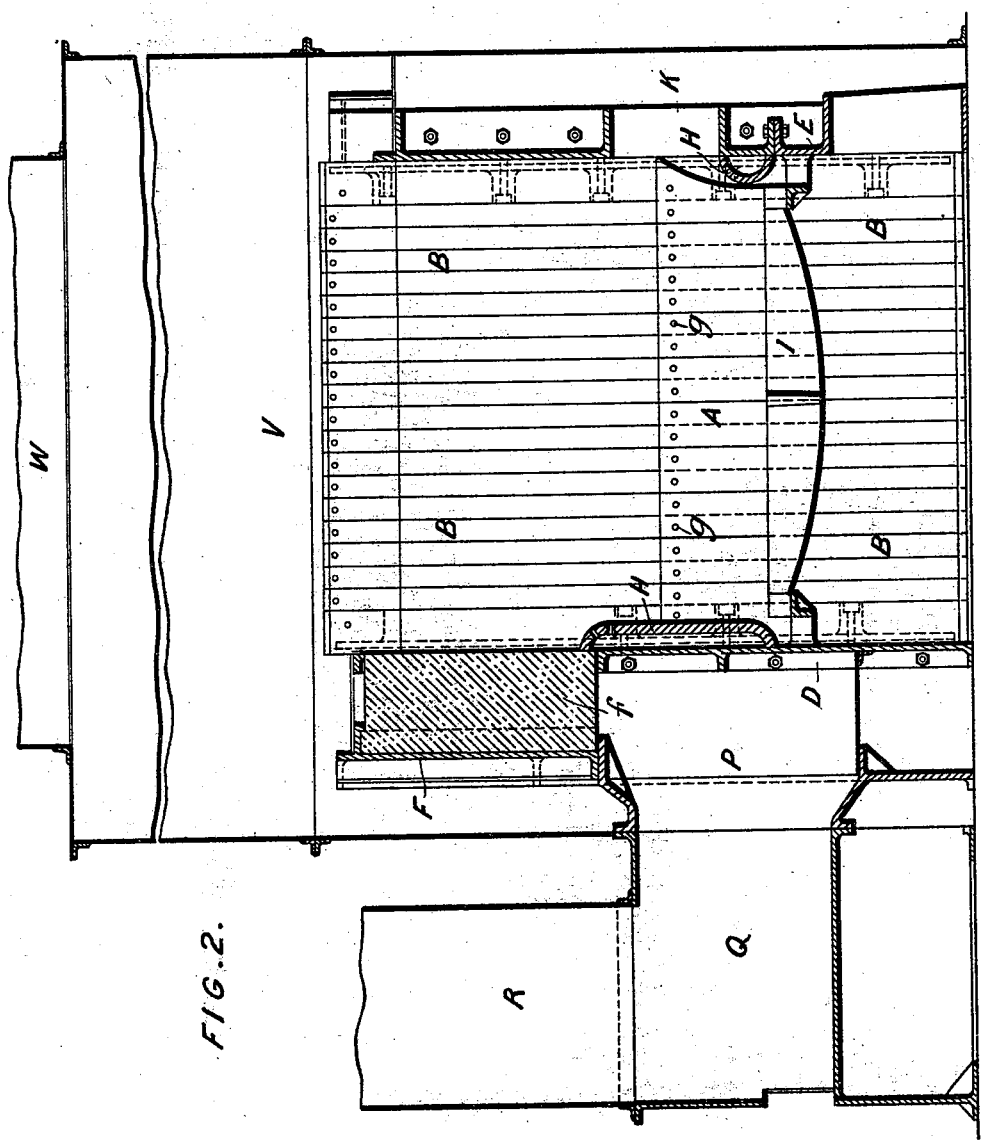
Figure 3:
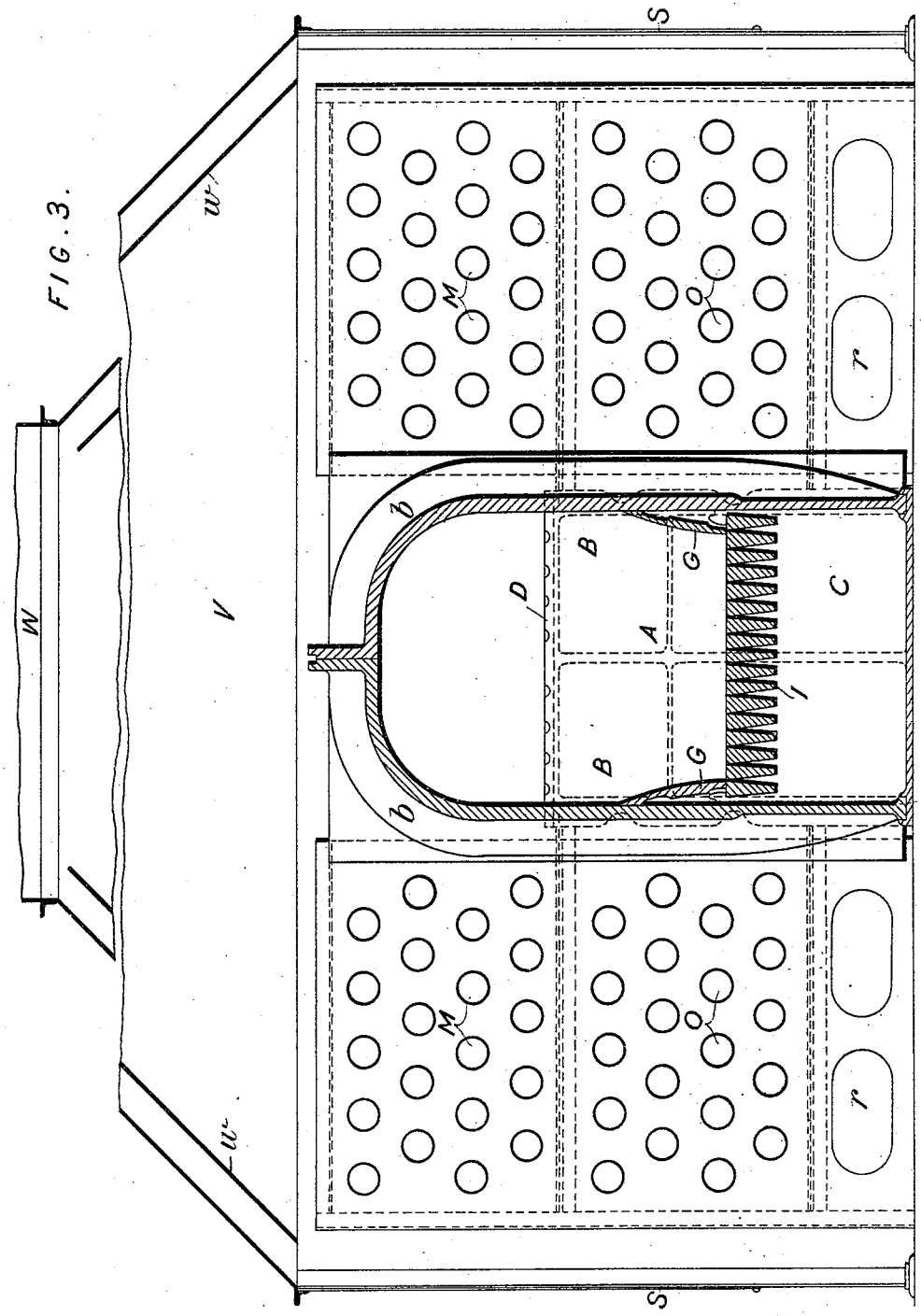
Figure 4:
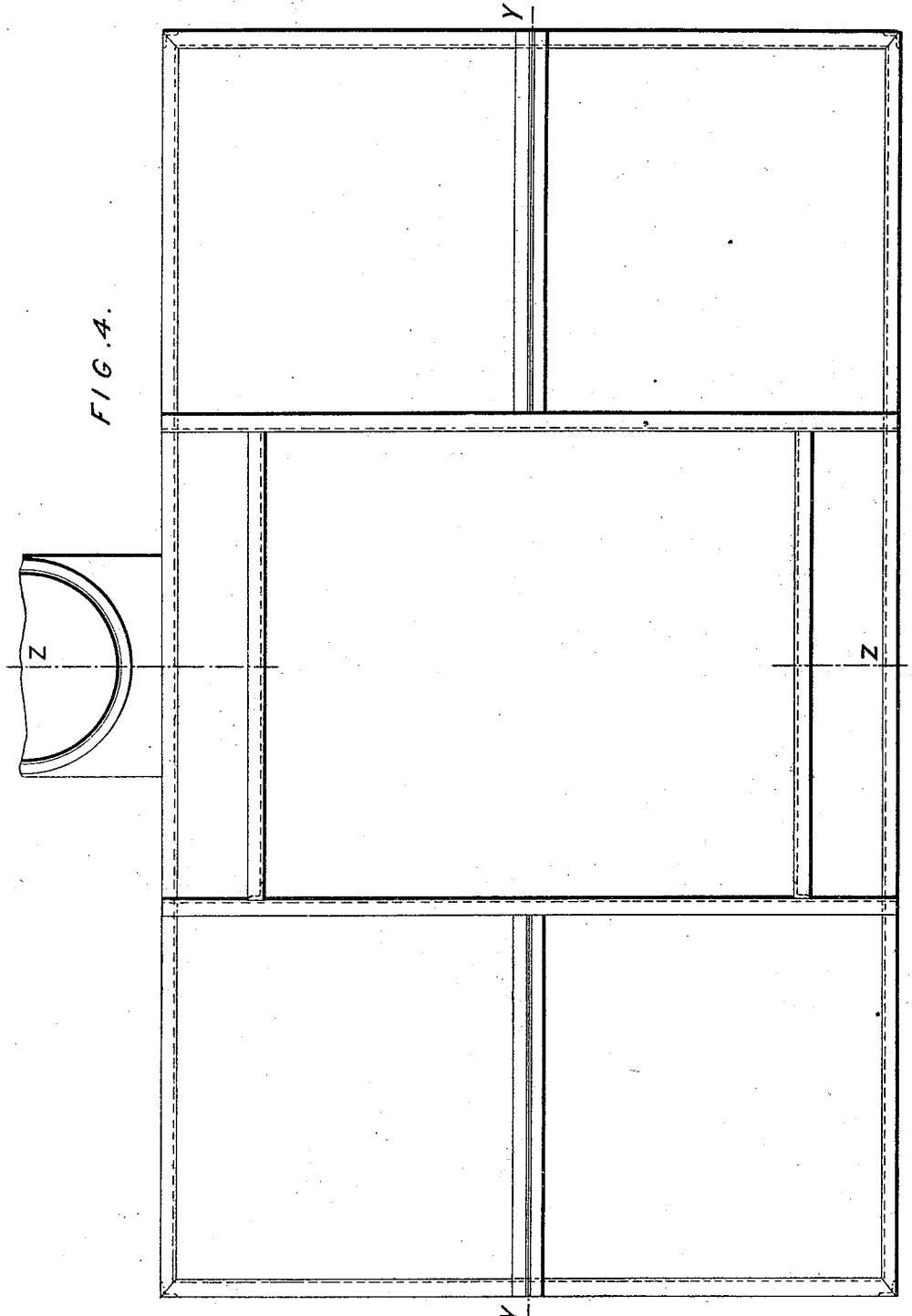

In the accompanying drawings, Figure 1 is a front elevation of a stove constructed according to my invention. Fig. 2 is a cross-section on line $z\,z$ of Fig. 4. Fig. 3 is a longitudinal section on line $y\,y$ of Fig. 4. Fig. 4 is a plan; Fig. 5, a sectional plan on line $x\,x$ of Fig. 1. Figs. 6, 7, and 8 are detail views, on a larger scale, showing in elevation, plan and horizontal section, respectively, the arrangement for securing the tubes or pipes in the walls or sides of the smoke-chambers.

A is the fireplace, and B B are the metal ribs forming and inclosing same, with gills or ribs $b$ on their outer side.

C is the ash-pit.

D is the back plate of fireplace, and E the front plate of same.

F is the back plate of smoke-chamber. $f\,f$ are fire-clay protecting-tiles for the same.

G G are the loose side tiles in the fireplace A for protecting the metal sides of the fireplace and supplying highly-heated air on the top of the fire to better complete the combustion of the gases.

$g\,g$ are the perforations in the top end of the tiles G G, through which the air from the ash-pit escapes over the top of the fire. H H are similar tiles protecting the front and back plates.

I I are the fire-bars, and K the fire-door.

L is the back smoke-chamber provided with doors $l\,l$ for cleaning and removing and replacing tubes.

M M are the upper range or set of tubes, which are secured by annular removable caps, hereinafter described, to the plates $k\,k$ at back and the plates $p\,p$ at front.

N N are the front smoke-chambers, with doors $n\,n$ for cleaning and removing the tubes, and which convey the smoke and products of combustion downward from the upper groups of tubes, M M, to the lower groups, O O, which are also secured by caps to the plates $k\,k$ and $p\,p$.

P is the flue or smoke-chamber leading from the tubes O O to the base Q of the chimney R.

S is the stove-casing with doors T T in front for access to the inner doors $n\,n$ in the front smoke-chambers, N N, and U U are similar doors at back.

$t\,t$ are perforations in the casing to admit an air-current between same and the smoke-chambers.

$r\,r$ are openings in the base continuation of the front and back tube-plates $k$ and $p$ for the passage of air.

V is the hot-air-collecting chamber or reservoir above the stove, and W is the duct for conveying the hot air from the chamber V to wherever it may be required for heating or drying purposes.

$w\,w$ are baffle-plates on lower face of hot-air-collecting chamber V.

Referring now to Figs. 6, 7, and 8, which illustrate the removable cap or cover for securing the tubes on the tube-plates, $k$ is the perforated tube-plate, in which the tube M is a close fit. $c$ is the removable cap or cover, with inclined lugs $d$, which engage under the catches $e$. $f'$ is a space left in the cap for expansion and contraction of the tube lengthwise. The catches $e$ are riveted or suitably attached to the plate.

What I claim, and desire to secure by Letters Patent, is—

1. In a stove or apparatus for heating air and having one or more inlets for the air to be heated and one or more outlets for the air after having been heated, the combination of a central furnace constructed as a gill stove, one or more smoke chambers at the back of the said furnace and in communication therewith, a set of flow tubes parallel with the sides of the furnace, one or more front smoke chambers between which and the said back smoke chambers the said flow tubes communicate, a return set of tubes below and parallel with the set of flow tubes and leading from the front smoke chambers, a back flue into which the return set of tubes discharge, this flue being in communication with the chimney and one or more air inlets at the lower part of the stove, all substantially as and for the purposes hereinbefore described and shown in the accompanying drawings.

2. In a stove or apparatus for heating air which has tubes fitting into perforations in the sides or walls of the smoke chambers, a tube fitting loosely into its perforations and projecting at both ends through said perforations, in combination with removable annular caps having grooves to receive the tube ends and the necessary packing the said caps having also external inclined lugs, and projecting snugs on the sides of the smoke chambers engaging with the said lugs when the caps are turned axially upon the tubes, substantially as and for the purposes hereinbefore described and shown in the accompanying drawings.

In witness whereof I have hereunto signed my name in the presence of two subscribing witnesses.

SAMUEL CLELAND DAVIDSON.

Witnesses:
   A. H. R. CARR,
   THOS. J. CARR.